United States Patent [19]

Konakai

[11] Patent Number: 5,430,554
[45] Date of Patent: Jul. 4, 1995

[54] VIDEO INTERFACE SYSTEM SENDING IMAGE DATA TOGETHER WITH CLOCK SIGNAL RECEIVED FROM IMAGE FORMING APPARATUS

[75] Inventor: Satoru Konakai, Kawasaki, Japan

[73] Assignee: Ricoh Company, Ltd., Tokyo, Japan

[21] Appl. No.: 226,847

[22] Filed: Apr. 13, 1994

[30] Foreign Application Priority Data

Apr. 16, 1993 [JP] Japan ................... 5-090301

[51] Int. Cl.⁶ .................. H04N 1/36; G06F 1/04; G06F 1/12; G06F 1/14
[52] U.S. Cl. .................. 358/409; 358/436; 358/442; 395/114; 395/275
[58] Field of Search ............... 358/401, 405, 406, 409, 358/468, 434, 435, 436, 438, 439, 442, 296, 300; 395/114, 275, 880, 881

[56] References Cited

U.S. PATENT DOCUMENTS

| | | | |
|---|---|---|---|
| 4,760,406 | 7/1988 | Sato et al. | 358/296 |
| 4,930,087 | 5/1990 | Egawa et al. | 395/114 |
| 5,001,567 | 3/1991 | Atobe | 358/300 |

Primary Examiner—Scott A. Rogers
Attorney, Agent, or Firm—Popham, Haik, Schnobrich & Kaufman, Ltd.

[57] ABSTRACT

A video interface system can cope with a plurality of printers having different clock signal frequencies with reduced timing skew between image data and a clock signal. The video interface system interfaces an image data supplying apparatus, such as a host computer, with a printer. The video interface system comprises a reference clock signal sending unit, provided in the image data supplying apparatus, for sending back a reference clock signal supplied by the printer by means of a loop back control. A shift register is provided in the image data supplying apparatus, and sends image data to the printer in synchronization with the reference clock signal supplied by the printer.

16 Claims, 3 Drawing Sheets

VIDEO INTERFACE SYSTEM SENDING IMAGE DATA TOGETHER WITH CLOCK SIGNAL RECEIVED FROM IMAGE FORMING APPARATUS

BACKGROUND OF THE INVENTION

The present invention relates to a video interface system provided between an image forming apparatus, such as a digital copy machine used as a printer, and an image data supplying apparatus, such as a host computer, which sends image data to the image forming apparatus.

Conventional video interface systems include two kinds of systems. One system is the so-called fixed frequency system in which only image data is transferred from a host computer to a printer used as an image forming apparatus, or image data and an internal clock signal are transferred together from the host computer to the printer. The other system is a system in which a clock signal is first supplied from the printer to the host computer, and then the host computer transfers image data in synchronization with the clock signal to the printer.

In the fixed frequency system, it is difficult to use with a host computer a plurality of printers having different clock frequencies since the clock frequency of the host computer is fixed. In this system, it is desirable that the host computer change the clock signal depending on the printer to be connected thereto. However, it is difficult to change the clock signal to correspond to a wide range of frequencies, and if there appears a printer having a new clock frequency, the host computer cannot cope with the new frequency.

Since the clock frequency used in the printer generally depends on the print speed, it is difficult to unify the clock frequency for the different types of printers. Even though the clock signal of the printers can be unified using a page buffer for each printer, the manufacturing cost of each printer is then increased.

In the latter system, since the clock frequency can be determined on the printer side, the above-mentioned problems can be eliminated. However, there is skew between the image data and the clock signal, which skew is caused by a delay in a transmission path, and thus this system is applicable only for a video interface having a low data transmission rate and a short transmission path.

SUMMARY OF THE INVENTION

It is a general object of the present invention to provide a video interface system in which the above-mentioned disadvantages are eliminated.

A more specific object of the present invention is to provide a video interface system which can cope with a plurality of printers having different clock signal frequencies.

Another object of the present invention is to provide a video interface system which can cope with a relatively long transmission line with a reduced timing skew between image data and a clock signal.

In order to achieve the above-mentioned objects, according to the present invention there is provided a video interface system which interfaces an image data supplying apparatus with a plurality of image forming apparatuses having different clock signal frequencies, the image forming apparatuses forming an image in accordance with image data supplied by the image data supplying apparatus, the video interface system comprising:

reference clock signal sending means, provided in the image data supplying apparatus, for sending back a reference clock signal supplied by the image forming apparatus by means of a loop back control; and image data sending means, provided in the image data supplying apparatus, for sending image data to the image forming apparatus in synchronization with the reference clock signal.

According to the present invention, the image data can be supplied from the image data supplying apparatus to the image forming apparatus in synchronization with the reference clock signal of the image forming apparatus, and thus image forming apparatuses having different clock signal frequencies can be connected to the image data supplying apparatus regardless of the clock signal of the image data supplying apparatus. Additionally, since the reference clock signal is also sent back to the image forming apparatus, timing skew between the image data and the reference clock signal is reduced. Accordingly, the video interface system according to the present invention is applicable to a case where an image forming apparatus is connected to an image data supplying apparatus via a relatively long transmission line.

Other objects, features and advantages of the present invention will become more apparent from the following descriptions when read in conjunction with the accompanying drawings.

DETAILED DESCRIPTION OF THE PREFERRED EMBODIMENTS

Figure 1:
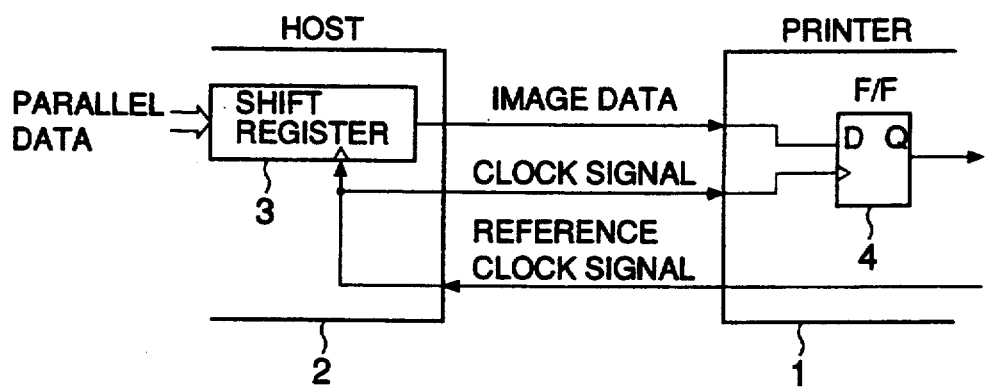
FIG. 1 is a block diagram for explaining the principle of a video interface according to the present invention.

A description will now be given, with reference to FIG. 1, of a principle of the present invention. FIG. 1 shows a block diagram of a video interface system, according to the present invention, interfacing between a printer 1 and a host computer 2. The printer 1 serves as an image forming apparatus. The host computer 2, usually a personal computer or a word processor, serves as an image data supplying apparatus. The image data and a clock signal are transferred from the host computer 2 to the printer in synchronization.

In the video interface system according to the present invention, a reference clock signal is supplied from the printer 1 to the host computer 2. In the host computer 2, the parallel image data to be sent to the printer 1 is supplied to a shift register 3. The shift register 3 latches the parallel image data using the reference clock signal sent from the printer 1, and sends the image data in serial form. At the same time, the host computer 2 sends back the reference clock signal to the printer 1 by means of a loop back control.

In the printer 1, the image data received from the host computer 2 is input to a data input terminal of a flip-flop circuit (F/F) 4. The reference clock signal received from the host computer 2 is also input to the flip-flop circuit 4. The image data is latched by the flip-flop circuit 4 in synchronization with the reference clock signal and output from a data output terminal Q of the flip-flop circuit 4.

In the above-mentioned video interface system, the host computer 2 does not have to supply any clock signal as far as the transfer of the image data is concerned, and the clock signal used for the printer 1 is determined by its own clock signal. Therefore, printers having different clock signal frequencies can be used with the host computer 2. Additionally, since the reference clock signal is sent back to the printer 2 at the same time the image data is transferred, timing skew generated between the image data and the clock signal is minimized, and thus restrictions in interface cable length and timing margin can be loose, resulting in realization of a video interface which provides design flexibility.

Figure 2:
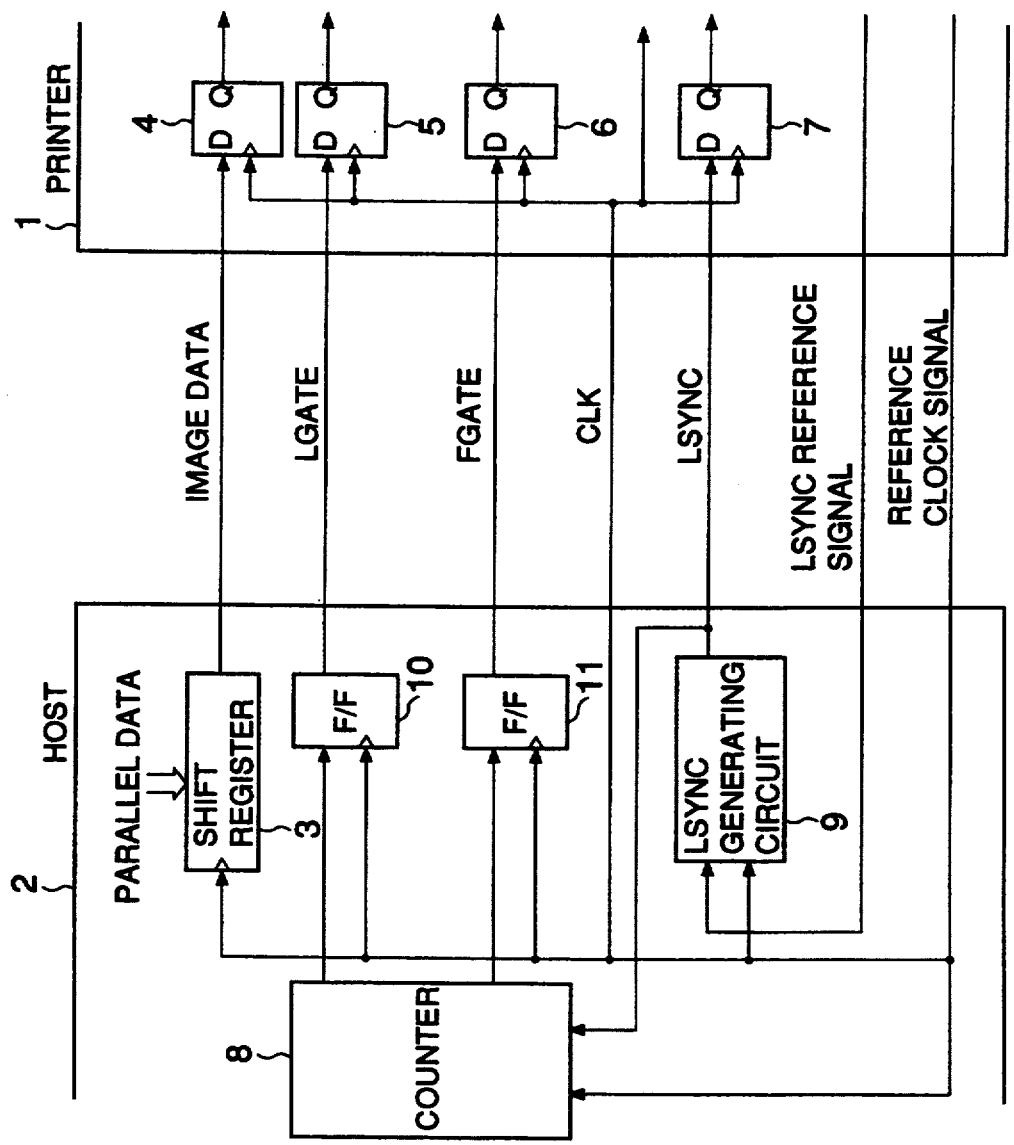
FIG. 2 is a block diagram of an embodiment of a video interface system according to the present invention.

FIG. 2 is a block diagram of an embodiment of a video interface system according to the present invention. In FIG. 2, parts the same as those shown in FIG. 1 are given the same reference numerals, and descriptions thereof will be omitted.

As shown in FIG. 2, the printer 1 comprises flip-flop circuits 5, 6 and 7 in addition to the flip-flop circuit 4. The flip-flop circuit 5 is provided for latching a line gate signal (LGATE). The flip-flop circuit 6 is provided for latching a frame gate signal (FGATE). The flip-flop circuit 7 is provided for latching a line synchronization signal (LSYNC).

The host computer 2 comprises a counter 8, an LSYNC generating circuit 9 and flip-flop circuits 10 and 11. An LSYNC reference signal is supplied from the printer 1 to the LSYNC generating circuit 9 of the host computer 2. The LSYNC signal is generated by the LSYNC generating circuit 9 using the LSYNC reference signal and the reference clock signal. The LSYNC signal is supplied to the counter 8, and also transferred to the flip-flop circuit 7 of the printer 1.

The counter 8 receives LSYNC generated by the LSYNC generating circuit 9 and the reference clock signal supplied by the printer 1. The counter 8 outputs count value to the flip-flop circuits 10 and 11, so that the line gate signal (LGATE) is generated by the flip-flop circuit 10 and the frame gate signal (FGATE) is generated by the flip-flop 11. The LGATE and FGATE signals are transferred to the printer 1 together with the clock signal (CLK) which is sent back to the printer 1 by means of a loop back control. The LGATE and FGATE signals are latched by the corresponding flip-flop circuits 5 and 6 of the printer 1 in synchronization with the clock signal (CLK) sent back from the host computer 2.

In this embodiment a secondary scanning speed can be determined by the printer side by supplying to the printer 2 the LGATE and FGATE signals, as well as the primary scanning speed.

Figure 3:
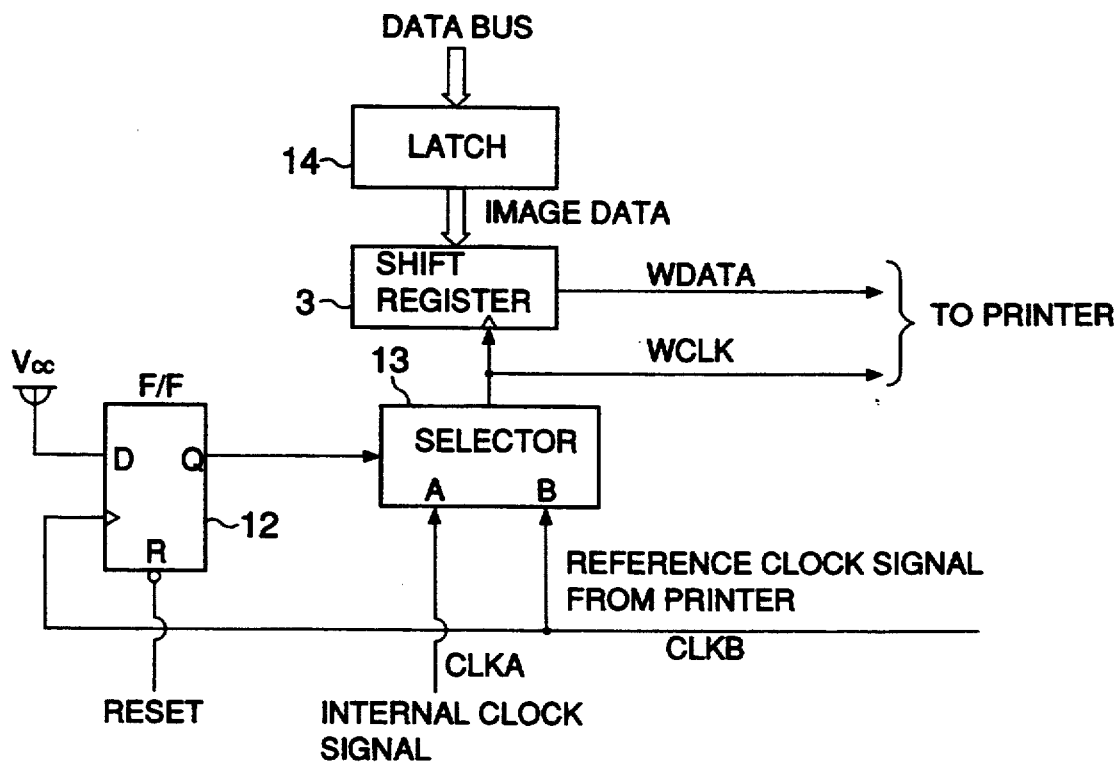
FIG. 3 is a block diagram of a host computer side of another embodiment of a video interface system according to the present invention.

FIG. 3 is a block diagram of a host computer side of another embodiment of a video interface system according to the present invention. This embodiment is provided with a flip-flop circuit 12 and a selector 13 to the host computer in addition to the components of the above-described embodiment. The flip-flop circuit serves as determining means for determining whether or not the reference clock signal is being supplied from a printer connected to the host computer. The selector 13 serves as switching means for switching the connection of the shift register 3 to either a reference clock signal line or an internal clock line through which a clock signal generated in the host computer is supplied. A data latch 14 latches parallel image data from a data bus and supplies it to the shift register 3.

In the present embodiment, when the voltage $V_{cc}$ is supplied to the flip-flop 12 by turning on a power of the host computer while the reference clock signal is supplied by the printer, a latch output "H" is output to the selector 13. The selector 13 outputs the reference clock signal, input to a terminal B of the selector 13, as a clock signal (WCLK). The WCLK signal is then supplied to the shift register 3. The shift register 3 transfers the image data supplied by the latch 14 to the printer in synchronization with the reference clock signal (WCLK). The WCLK is also transferred to the printer at the same time.

When the reference clock signal is not supplied to the host computer due to the reason that the printer has no reference clock signal supplying function, the flip-flop circuit 12 cannot latch the reference clock signal when $V_{cc}$ is supplied to the flip-flop. Accordingly, the output from the flip-flop 12 remains in the "L" state. In this case, the selector 13 selects the internal clock signal, which is the clock signal generated in the host computer, input to the terminal A, and outputs the internal clock signal as the WCLK signal.

In the present embodiment, the host computer can distinguish between types of printers connected thereto, that is whether or not the printer has a reference clock signal supplying function, not by a software but by hardware of a simple construction.

Figure 4:
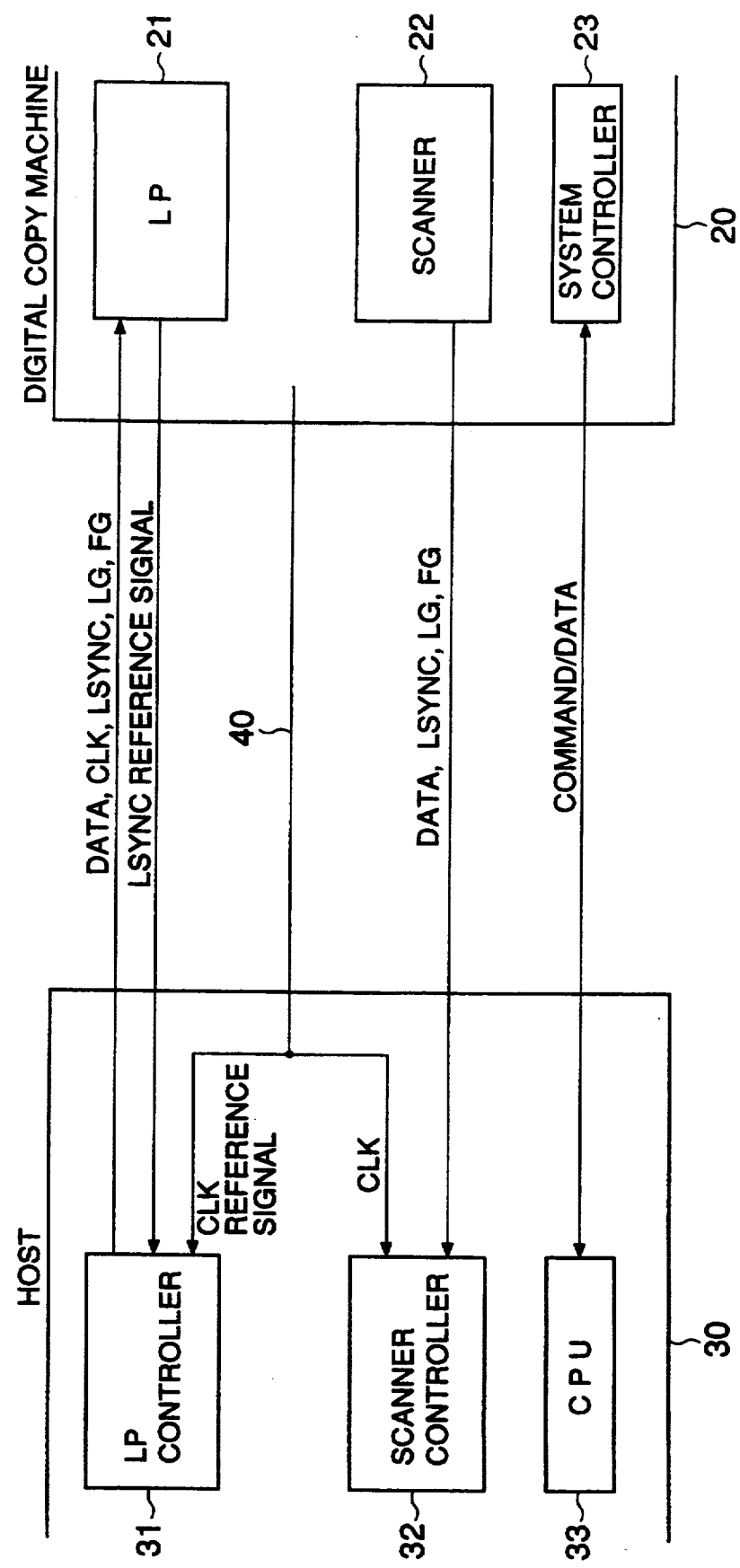
FIG. 4 is a block diagram of an embodiment of the present invention in a case where a digital copy machine is used as an image forming apparatus.

FIG. 4 is a block diagram of an embodiment of the present invention in a case where a digital copy machine 20 is used as an image forming apparatus. The digital copy machine 20 comprises laser printer (LP) 21, a scanner 22 and a system controller 23. A host computer 30 comprises a LP controller 31, a scanner controller 32 and a micro computer (CPU) 33.

Various commands and data are transmitted between the system controller 23 of the digital copy machine 20 and the CPU 33 of the host computer 30. The scanner 22 transfers image data generated by scanning an original to the scanner controller 32 of the host computer 30. The scanner 22 also transfers the line synchronization signal (LSYNC), the line gate signal (LG) and the frame gate signal (FG) to the scanner controller 32 of the host computer 30 via the same transmission line. There is provided a transmission line between the scanner 22 and the scanner controller 32 through which transmission line the digital copy machine 20 sends a clock signal to the scanner controller 32 of the host computer 30.

In the present embodiment, the reference clock signal supplied to the LP controller 31 is also transmitted via the transmission line 40 even when the digital copy machine 20 is used as an image forming apparatus.

The reference clock signal transmitted via the transmission line 40 is supplied to the LP controller 31 so that the LP controller 31 generates the image data, the line synchronization signal (LSYNC), the line gate signal (LG) and the frame gate signal (FG). Those signals are sent together with the clock signal (CLK) to the LP 21 of the digital copy machine 20.

In the present embodiment, a video interface system can be realized which has interchangeability with a conventional video interface for a digital copy machine in which the fixed clock frequency system is used.

The present invention is not limited to the specifically disclosed embodiments, and variations and modifications may be made without departing from the scope of the present invention.

What is claimed is:

1. A video interface system which interfaces an image data supplying apparatus with a plurality of image forming apparatuses having different clock frequencies, said image forming apparatuses forming an image in accordance with image data supplied by the image data supplying apparatus, said video interface system comprising:
   a) reference clock signal receiving means, provided in said image data supplying apparatus, for receiving a reference clock signal supplied by one of said image forming apparatuses; and
   b) image data sending means, provided in said image data supplying apparatus, for sending a reference clock signal received from one of said image forming apparatuses and image data in synchronization with said received reference clock signal to said one of said image forming apparatuses.

2. The video interface system as claimed in claim 1, wherein said image data sending means comprises a shift register which receives parallel image data and outputs serial image data using said reference clock signal.

3. The video interface system as claimed in claim 1, wherein:
   said reference clock signal receiving means includes a flip-flop circuit.

4. The video interface system as claimed in claim 1, further comprising line gate signal sending means, provided in said image data supplying apparatus, for sending to said image forming apparatus a line gate signal used for line alignment in said image forming apparatus.

5. The video interface system as claimed in claim 4, wherein receiving means is provided in said image forming apparatus for receiving said line gate signal and said reference clock signal supplied by said image data supplying apparatus, and outputting said line gate signal in synchronization with said reference clock signal supplied by said image data supplying apparatus.

6. The video interface system as claimed in claim 5, wherein said receiving means comprises a flip-flop circuit.

7. The video interface system as claimed in claim 1, further comprising frame gate signal sending means, provided in said image data supplying apparatus, for sending to said image forming apparatus a frame gate signal used for frame alignment in said image forming apparatus.

8. The video interface system as claimed in claim 7, wherein receiving means is provided in said image forming means for receiving said frame gate signal and said reference clock signal supplied by said image data supplying apparatus, and outputting said frame gate signal in synchronization with said reference clock signal supplied by said image data supplying apparatus.

9. The video interface system as claimed in claim 8, wherein said receiving means comprises a flip-flop circuit.

10. The video interface system as claimed in claim 1, further comprising;
    inputting means, provided in said image data supplying apparatus, for selectively inputting to said image data sending means either:
    1) said reference clock signal supplied by said one of said image forming apparatuses or
    2) an internal clock signal generated in said image data supplying apparatus.

11. The video interface system as claimed in claim 10, wherein:
    said inputting means inputs to said image data sending means said reference clock signal when said reference clock signal is being supplied to said image data supplying apparatus; and
    said inputting means inputs to said image data sending means said internal clock signal when said reference clock signal is not being supplied by said one of said image forming apparatuses.

12. The video interface system as claimed in claim 11, wherein said inputting means comprises determining means for determining whether or not said reference clock signal is being supplied by said image forming apparatus, and selecting means for selecting and outputting said internal clock to said image data sending means and said image forming apparatus when said determining means determines that said reference clock signal is not being supplied to said image data supplying apparatus.

13. The video interface system as claimed in claim 12, wherein said determining means comprises a flip-flop circuit to which a power supply voltage and said reference clock signal are input, and said selecting means comprises a selector to which said reference clock signal and said internal clock signal are input, and wherein said flip-flop circuit outputs a high state signal to said selector when said power supply voltage and said reference clock signal are input to said flip-flop circuit at the same time, said selector selecting and outputting said reference clock signal to said image data sending means when said high state signal is supplied from said flip-flop circuit.

14. The video interface system as claimed in claim 1, wherein said image forming apparatus comprises a digital copy machine having a clock signal transmission line connected to said image data supplying apparatus, and wherein said reference clock signal is transmitted from said digital copy machine to said image data supplying apparatus through said clock signal transmission line.

15. A video interface system which interfaces an image data supplying apparatus with a plurality of image forming apparatuses having different clock frequencies, said image forming apparatuses forming an image in accordance with image data supplied by the image data supplying apparatus, said video interface system comprising:
    a) reference clock signal sending means, provided in said image data supplying apparatus, for sending back a reference clock signal supplied by one of said image forming apparatuses by means of loop back control;
    b) image data sending means, provided in said image data supplying apparatus, for sending image data to said one of said image forming apparatuses in synchronization with said reference clock signal; and
    c) inputting means, provided in said image data supplying apparatus, for selectively inputting to said image data sending means either said reference clock signal supplied by said one of said image forming apparatuses or an internal clock signal generated in said image data supplying apparatus; wherein:
- A) said inputting means inputs to said image data sending means said reference clock signal when said reference clock signal is being supplied to said image data supplying apparatus;
- B) said inputting means inputs to said image data sending means said internal clock signal when said reference clock signal is not being supplied by said one of said image forming apparatuses; and
- C) said inputting means includes:
  1) determining means for determining whether or not said reference clock signal is being supplied by said one of said image forming apparatuses; and
  2) selecting means for selecting and outputting said internal clock to said image data sending means and said one of said image forming apparatuses when said determining means determines that said reference clock signal is not being supplied to said image data supplying apparatus.

16. The video interface system as claimed in claim 15, wherein:
said determining means includes a flip-flop circuit to which a power supply voltage and said reference clock signal are input;
said selecting means includes a selector to which said reference clock signal and said internal clock signal are input;
said flip-flop circuit outputs a high state signal to said selector when said power supply voltage and said reference clock signal are input to said flip-flop circuit at the same time; and
said selector selects and outputs said reference clock signal to said image data sending means when said high state signal is supplied from said flip-flop circuit.

* * * * *